Feb. 14, 1956 H. C. FISCHER ET AL 2,734,347
APPARATUS FOR PRODUCING AND DISPENSING BEVERAGES
HAVING FROZEN PARTICLES THEREIN
Filed Oct. 18, 1952 4 Sheets-Sheet 1

INVENTORS
Harry C. Fischer &
Louis P. Benua
BY W. N. McDowell
ATTORNEY

Feb. 14, 1956    H. C. FISCHER ET AL    2,734,347
APPARATUS FOR PRODUCING AND DISPENSING BEVERAGES
HAVING FROZEN PARTICLES THEREIN
Filed Oct. 18, 1952                    4 Sheets-Sheet 2

INVENTORS
*Harry C. Fischer &*
*Louis P. Benua*

BY *W. H. McDowell*
ATTORNEY

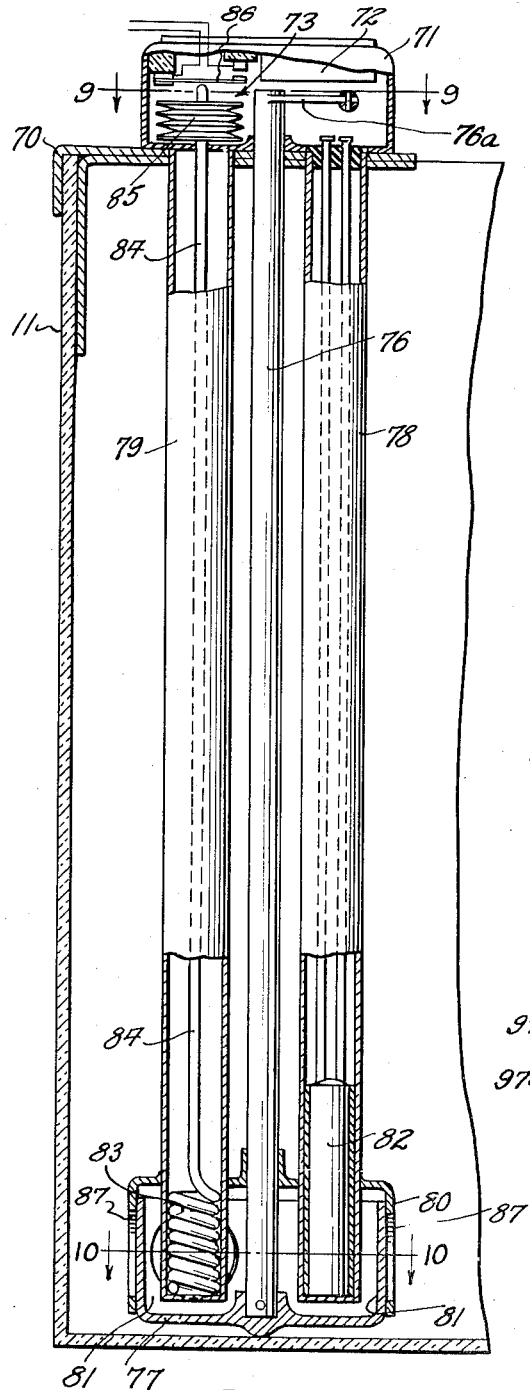
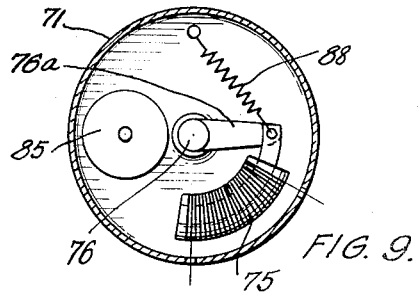
FIG. 9.
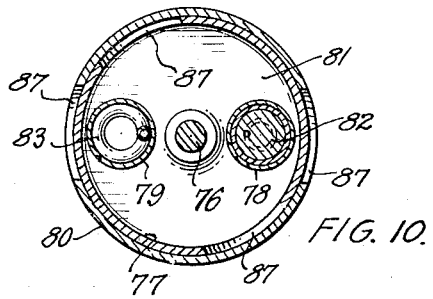
FIG. 10.
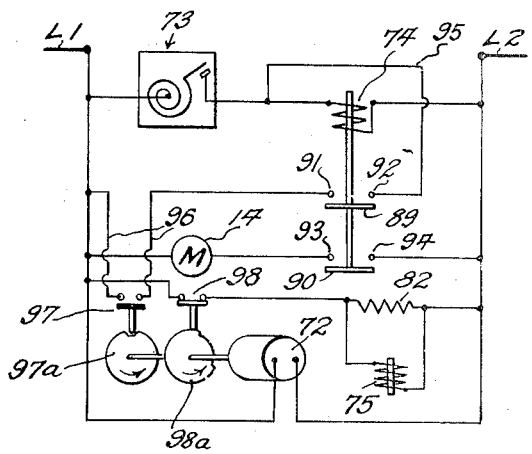
FIG. 11.
FIG. 8.
INVENTORS
Harry C. Fischer &
Louis P. Benua
BY W. N. McDowell
ATTORNEY Feb. 14, 1956 H. C. FISCHER ET AL 2,734,347
APPARATUS FOR PRODUCING AND DISPENSING BEVERAGES
HAVING FROZEN PARTICLES THEREIN
Filed Oct. 18, 1952 4 Sheets-Sheet 4
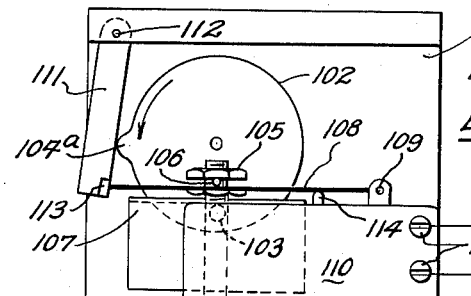
FIG. 12.
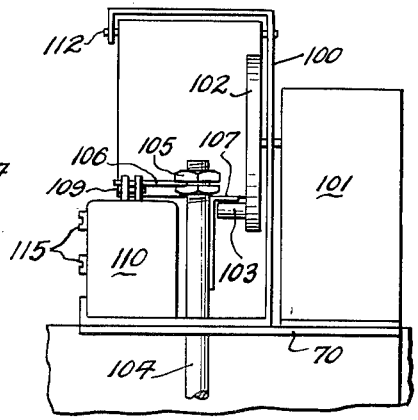
FIG. 13.
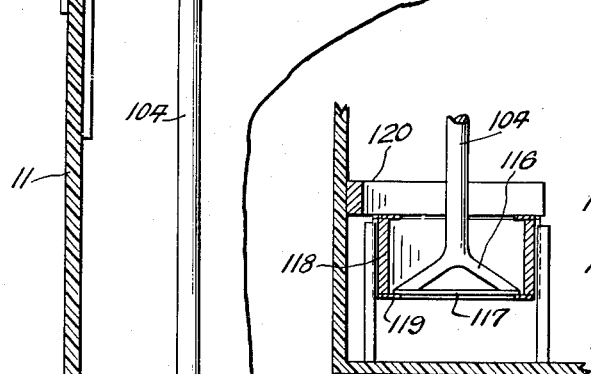
FIG. 17. FIG. 14.
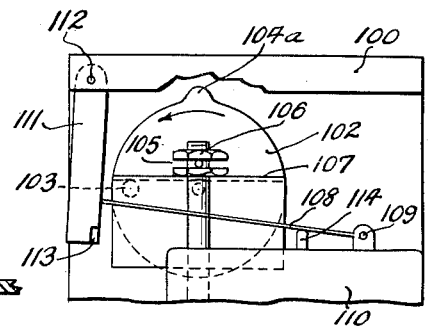
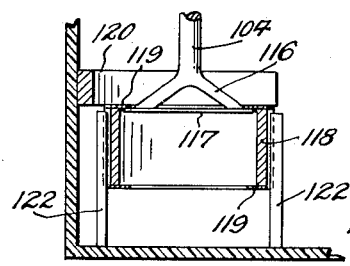
FIG. 16. FIG. 15.
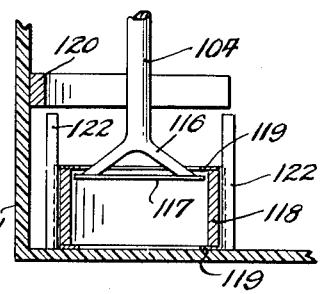
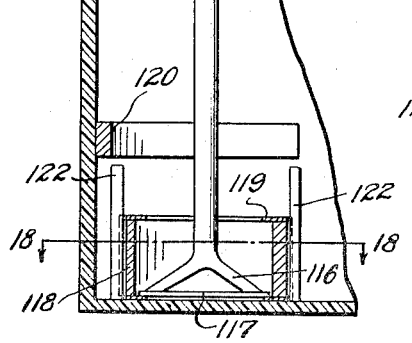
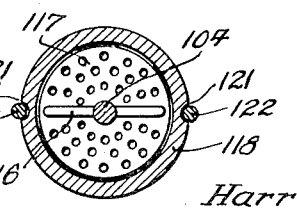
FIG. 18.
INVENTORS
Harry C. Fischer &
Louis P. Benua
BY
M. S. McDowell ATTORNEY United States Patent Office 2,734,347
Patented Feb. 14, 1956

2,734,347
APPARATUS FOR PRODUCING AND DISPENSING BEVERAGES HAVING FROZEN PARTICLES THEREIN

Harry C. Fischer, Columbus, and Louis P. Benua, Gahanna, Ohio, assignors to The Ebco Manufacturing Company, Columbus, Ohio, a corporation of Ohio Application October 18, 1952, Serial No. 315,567

11 Claims. (Cl. 62—4)

The present invention relates to an improved method and machine for making and dispensing iced or semifrozen beverages, wherein the beverage, such as a fruit juice or the like, constitutes a slushy mixture of ice particles and liquids.

In the past, there have been several attempts to produce a commercially feasible machine or dispenser of this type, but so far as we are aware, methods and apparatus previously proposed have been entirely inefficient, if not impractical, due to the lack of an efficient means for controlling the proportion or amount of frozen particles within the liquid beverage.

Generally, prior art apparatus of which we are aware comprises a receptacle for the beverage, an agitator and/or scraper mechanism for circulating the beverage within the receptacle and for removing frozen particles from the walls of the receptacle or an associated heat exchange surface, a refrigerating unit including a heat exchange member within or surrounding the receptacle, a compressor for circulating a refrigerant through the heat exchange member, and an electric motor for driving the compressor of the refrigerating system. Machines of this general type are set forth in the prior patents of T. L. Hartman, No. 2,134,787, issued November 1, 1938; A. F. Willat, No. 2,150,792, issued March 14, 1939; and H. F. Zoller et al., No. 2,358,756, issued September 19, 1944. However, by reference to the disclosures of these prior art patents, it is to be noted that while each proposes a so-called automatic control for operating the refrigerating system of the machine to maintain a substantially constant percentage or proportion of frozen particles within the beverage, such controls constitute temperature-responsive switches, in the case of the Hartman and Zoller et al. patents, and a so-called viscosity-responsive switch in the case of the Willat patent.

It has been found through experimentation that it is practically impossible to obtain efficient results in maintaining a substantially constant proportion of frozen particles within a beverage where the refrigeration system is controlled by thermostatic means responsive to the temperature of the beverage. This will be manifest when considering that the temperature change necessary to form a given percentage or proportion of ice crystals within a liquid after the temperature thereof has been reduced substantially to its freezing point is extremely small, and, therefore, substantially imperceptible to the ordinary types of thermostatic switches which might be feasibly employed in dispensers of this type. Ordinarily, when a fruit juice beverage is chilled to a temperature at which ice crystals or frozen particles will form therein, a .1° to .2° F. change in temperature is sufficient to cause the beverage to go from a completely liquid to a non-flowing frozen state.

Also, apparatus of this character which proposes the use of thermostatic switch means to maintain a given proportion of ice crystals within the beverage is subject to objection, in that a thermostatic switch must be adjusted in order to compensate for variations in freezing temperatures as between different types and concentrations of beverages to be dispersed by the machine, and, therefore, is highly susceptible to human as well as mechanical error in arriving at proper adjustments to yield the desired consistency of semifrozen beverage.

In apparatus such as that proposed in the Willat patent, No. 2,150,792, and which proposes the use of a viscosity-responsive switch to control the refrigeration of the beverage to maintain a substantially constant proportion of frozen particles therein, it has been found through practice that such a control is highly inefficient in view of the fact that the change in viscosity as between a beverage having, for example, 10% by apparent volume of frozen particles therein and a beverage having 75% by apparent volume of frozen particles therein, is substantially negligible, and is not susceptible to easy measurement by a viscosity-responsive switch means which operates on the principle of resistance to a rotating member created by a change in viscosity of the liquid.

It follows, therefore, that the primary object of the present invention is to provide an improved and practical refrigerated dispenser for making semifrozen beverages and control means therefor which is highly efficient in controlling the operation of an associated refrigeration system directly in response to the proportion or amount of frozen particles within the beverage, whereby a substantially constant proportion of frozen particles may be maintained within the beverage at all times, in order to obtain uniformity of the beverage dispensed from the machine.

It is another object of the invention to provide a control mechanism of this character which functions to segregate a representative sample or part of the beverage from the main body thereof within the dispenser, and to test such sample to determine the relative proportion of frozen particles to unfrozen particles therein, and an electrical switch means associated with the sampling means in a manner to be directly responsive to the amount or proportion of frozen particles or ice crystals within the sample for controlling the energization of an electric motor utilized in circulating the refrigerant through the refrigerating system of the associated dispenser.

A further object of the invention is to provide a switch for controlling the energization of the compressor motor of a refrigeration system which is operable automatically in response to a predetermined percentage of frozen particles within a beverage to open or deenergize the operating circuit for the motor of the refrigeration system and thereby to interrupt refrigeration of the beverage, and which is also operable automatically in response to the absence of, or a predetermined relatively smaller proportion of, frozen particles within the beverage to energize the refrigeration circuit thereby to increase the percentage of frozen particles within the beverage.

For a further and more detailed understanding of the present invention and the various additional objects and advantages realized therefrom, reference is made to the following description and the accompanying drawings, wherein:

Fig. 8 is a fragmentary vertical sectional view taken through a modified form of control apparatus which may be utilized in carrying out the present invention;

Fig. 9 is a horizontal sectional view taken on the line 9—9 of Fig. 8;

Fig. 10 is a similar view taken along the line 10—10 of Fig. 8.

Fig. 11 is a diagram of the electrical circuit employed in the modified control apparatus of Fig. 8;

Fig. 12 is a side elevational view, partially in vertical section, of a further modified form of control apparatus formed in accordance with the present invention and occupying a circuit-closing position;

Fig. 13 is a fragmentary end elevational view of the actuating mechanism of the control apparatus of Fig. 12;

Fig. 14 is a side elevational view of the actuating mechanism rotated 270° from its position as shown in Fig. 12;

Figs. 15–17 are detailed vertical sectional views of the sampling mechanism of Fig. 12 showing the various positions occupied thereby during a testing cycle;

Fig. 18 is a horizontal vertical view taken along the line 18—18 of Fig. 12.

Figure 1:
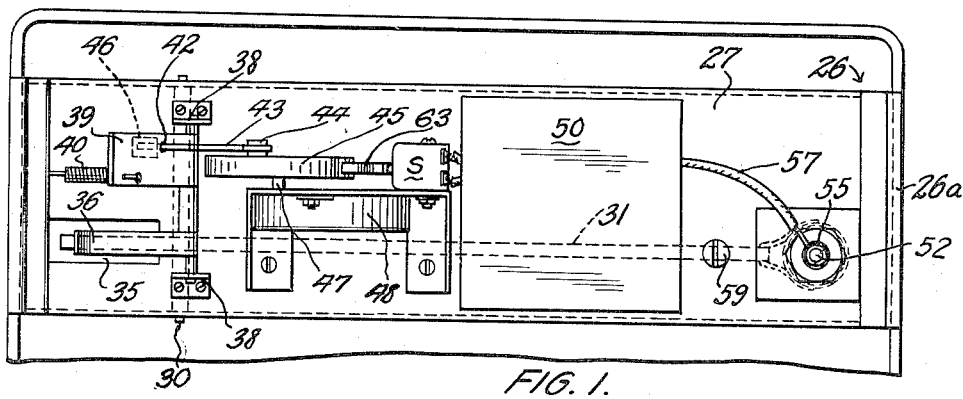
Fig. 1 is a fragmentary top plan view of a preferred form of our improved control mechanism operatively installed in the upper portion of the receptacle portion of a beverage dispenser.

Referring now to the drawings, and particularly to the preferred form of control as disclosed in Figs. 1-6 thereof, the numeral 10 designates generally the upper portion of a beverage dispenser which includes an upper receptacle body 11, preferably formed from synthetic resinous material possessing relatively low heat conductivity charactertistics, and provided with a removable lid portion 12. The dispenser further embodies a lower cabinet section 13 which houses the components of a refrigeration system as illustrated diagrammatically in Fig. 2. The refrigerating system comprises an electric motor 14 drivingly connected with a refrigerant compressor 15 which is arranged to circuate a refrigerant through a condenser coil 16 from whence the refrigerant flows through an expansion valve or equivalent means 17 and thence through an evaporator coil or passage 18 formed, or otherwise provided, in a heat exchanger assembly 19 positioned below the receptacle 11 and which, as disclosed in our copending application Serial Number 281,636, filed April 10, 1952, entitled Beverage Cooler and Dispenser, may comprise a pair of relatively separable plate sections 19a and 19b carried respectively by the lower cabinet section 13 and the receptacle section 11. The plate sections 19a and 19b are formed from a relatively high heat conductivity metal, such as aluminum. The section 19b is provided upon its upper surface with a contact plate 20 formed from a corrosion-resistant stainless metal. Advantageously, the contact plate 20 may form a part of the bottom wall of the receptacle 11 for direct contact with a beverage contained therein. From the evaporator passage 18, the refrigerant is returned to the compressor 15 by way of a return conduit or line 21.

Figure 7:
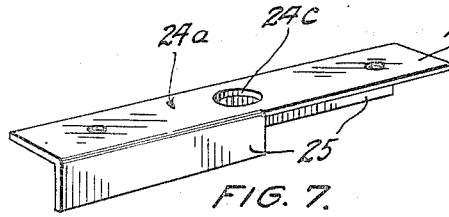
Fig. 7 is a detailed perspective view of the ice-removing agitator element employed in the beverage dispenser.
Figure 5:
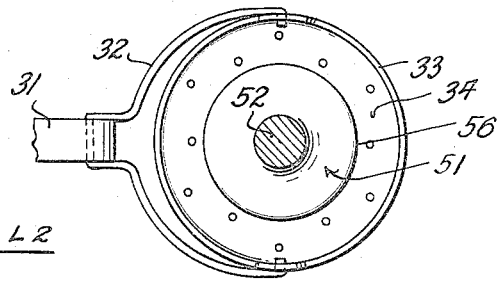
Fig. 5 is a horizontal sectional view taken along the line 5—5 of Fig. 4.

Extending upwardly from the lower cabinet section 13, and journaled through the central portion of the heat exchange assembly 19, is an agitator drive shaft 22 which is drivingly connected at its lower end with a second and separate electric motor, not shown, which functions to constantly drive the shaft 22. The shaft 22 continues upwardly through the receptacle 11 and within a tubular bearing casing 23 and terminates in a pair of downwardly projecting arms 24. The arms 24 are joined at their lower ends, as by welding or other suitable means, to the outer end portion of a generally horizontally disposed agitator and ice-removing device, generally indicated by the numeral 24a. The latter comprises a single piece body provided with a flat, horizontally extending, upper web 24b having a central bearing opening 24c which encompasses the bearing tube 23, and which is formed on opposite sides with downturned, vertically arranged blade members 25. As seen particularly in Fig. 7, each of the blade members 25 extends along one edge of the body from one end to approximately the center thereof, and the lower edges of the blade members 25 are so arranged as to be in closely spaced relation to the upper surface of the contact plate 20 of the heat exchange assembly 19. In this manner, the blade members 25, upon rotation thereof by the arms 24 and shaft 22, serve not only to stir and agitate the beverage contained in the receptacle 11, but also to immediately remove ice crystals which form upon the upper surface of the plate 20. In this connection, it will be understood that the lower edges of the blade members 25 do not actually engage or scrape the upper surface of the plate 20, but the spacing between the blades and the plate is so determined that the blades will strike any measurable size of ice crystals which form upon the cold upper surface of the plate 20 and will immediately carry such crystals away from adherence with the plate and dispense the same within the main body of beverage.

Secured upon the upper rim of the receptacle body 11 toward one side thereof is an elongated U-shaped metallic frame 26 which is provided with supporting flanges 26a adapted to overlie the upper edge of the receptacle body 11 and be supported thereon. The frame 26 is formed in its intermediate portion with a substantially flat bed plate 27 which is formed along its longitudinal side edges with downwardly turned depending flanges 28 which form with the bed plate 27 a substantially inverted U-shaped channel along the lower side of the frame 26.

The frame 26 is arranged within the receptacle 11 above the maximum level of liquid therein, and, as previously explained, on one side of the receptacle out of the vertical plane of the stirring arms 24. The downturned flanges 28 of the frame are formed with transversely registering hooked slots 29 which serve to pivotally and demountably support the ends of a pivot shaft 30 connected with and supporting the inner end portion of an elongated dipper rod 31. The rod 31 terminates at its outer end in a bifurcated bail extension 32 which pivotally supports a relatively shallow, open-topped dipper body 33. As shown particularly in Fig. 4 of the drawings, the dipper 33 is provided with a bottom wall 34 which is formed at spaced intervals with a plurality of relatively small perforations or openings which permit liquids to drain relatively slowly from the bottom of the dipper as the latter moves upwardly above the level of beverage contained in the receptacle, while maintaining within the dipper body frozen particles or ice crystals.

Figure 2:
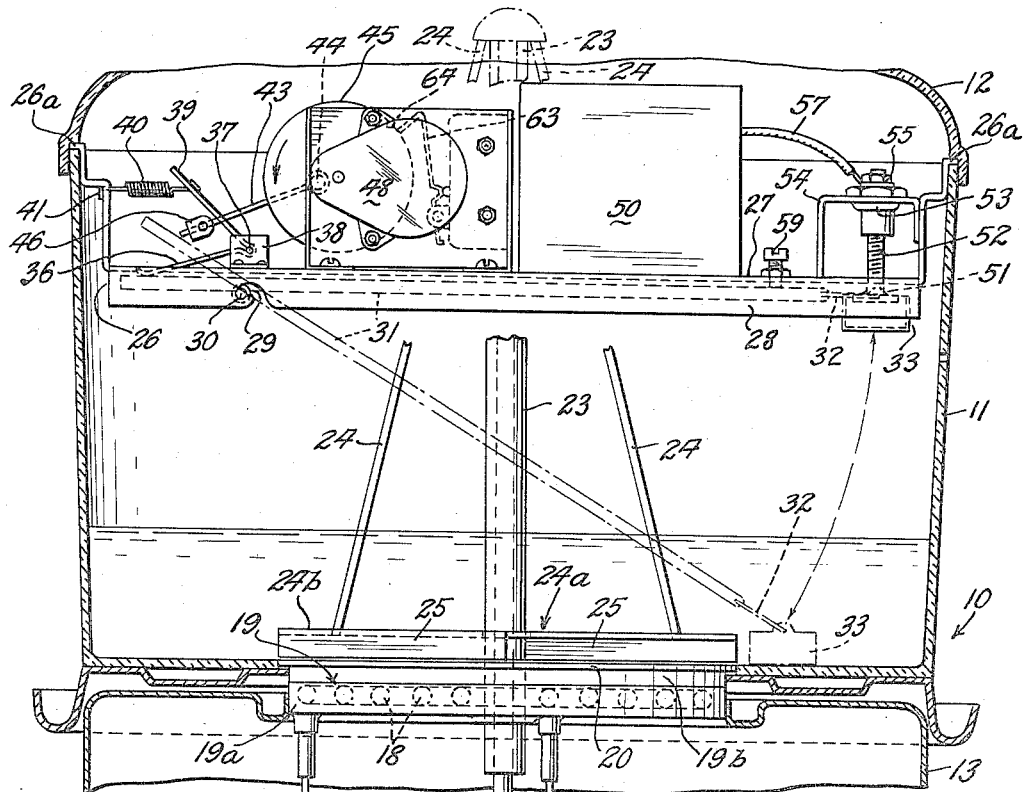
Fig. 2 is a transverse vertical sectional view taken through the receptacle of a beverage dispenser incorporating our improved control mechanism, and wherein an associated refrigeration circuit is shown diagrammatically.
Figure 3:
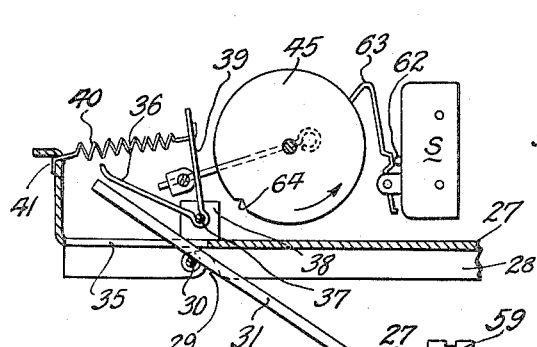
Fig. 3 is a fragmentary side elevational view of the dipper-actuating mechanism of the present control.
Figure 4:
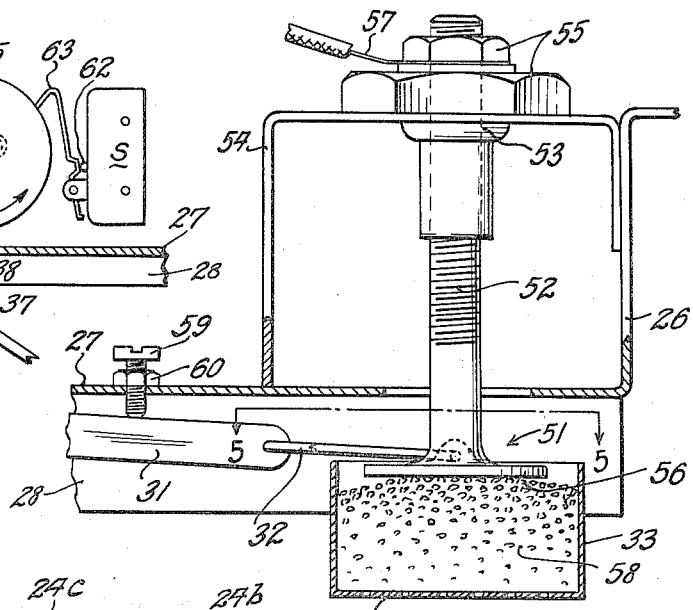
Fig. 4 is an enlarged vertical sectional view taken through the dipper as the same reaches its uppermost or testing position within the receptacle.

The dipper-supporting arm 31 is arranged for vertical swinging movement within the receptacle body 11 about the pivot shaft 30, and has its extreme inner end portion arranged to project upwardly through a slot 35 formed in the bed plate 27 of the frame, when the rod and dipper occupy their immersed position at the bottom of the receptacle 11, as indicated by broken lines in Fig. 2. In the absence of outside restraint, the arm 31 and dipper 33 are arranged so as to swing downwardly by gravity toward the bottom of the receptacle 11. To move the dipper arm 31 upwardly into substantially parallel relation with the bed plate 27 of the frame, as indicated in Fig. 4, there is provided a first crank arm 36 which is carried by a rock shaft 37 rotatably supported within a pair of transversely spaced bearing brackets 38 secured to the upper side of the base plate 27. The shaft 37 carries a second angularly related crank arm 39 disposed in laterally offset relation to the arm 36, and which is engaged by one end of a contractile spring 40, the latter being anchored to the frame 26, as at 41. Thus, the spring 40 serves to urge the arms 39 and 36 in a counterclockwise drection, as viewed from Figs. 2 and 3, and to force the arm 36 into engagement with the inner end portion of the dipper arm 31, in a manner to elevate the latter within the channel provided on the under side of the frame 26.

As shown in Fig. 1, the arm 39 is formed in its intermediate region with an opening 42 which slidably receives a connecting rod 43 which is pivotally secured to a crank stud 44 carried upon a rotatable cam disk 45. The outer end of the connecting rod 43 is provided on the opposite side of the arm 39 with a stop member 46 which may be adjusted longitudinally of the rod 43 with respect to the back side of the arm 39.

The cam disk 45 is drivingly connected through a shaft 47 with an electric motor 48 which is mounted atop the bed plate 27 of the frame 26. By reference to Figs. 2 and 3 of the drawings, it will be seen that as the motor 48 drives the cam disk 45, the connecting rod 43 is reciprocated in a manner to pull outwardly upon the lever arm 39 against the action of the spring 40 which, in turn, causes the lever 36 to disengage from the arm 31 and permit the latter to swing downwardly by gravity, toward the bottom of the receptacle. Also, upon continued rotation of the disk 45, the connecting rod 43 moves outwardly with respect to the disk to permit the lever arm 39 to swing backwardly under action of the spring 40 and thereby to cause the arm 36 to press against the inner end of the rod 31 and elevate the dipper within the receptacle 11.

Figure 6:
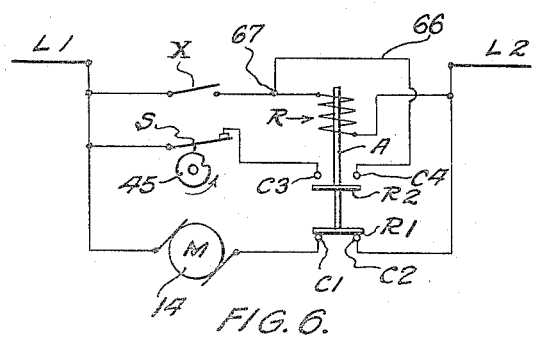
Fig. 6 is a diagram of the electric circuit employed in the present control mechanism.

Also supported upon the base plate 27 of the frame is a switch box 50 which houses a relay switch R, as shown in Fig. 6, and the various electrical terminal connections associated with the electrical circuit of the present control.

Mounted on the frame 26 in the plane of vertical movement of the dipper 33 is a stationary, vertically adjustable electrode 51 which is provided with a screw-threaded shank portion 52 threadedly carried in an insulating dielectric bushing 53 rigidly carried in a secondary bracket 54 attached to the frame 26. Lock nuts 55 engage the upper end of the shank 52 of the electrode and maintain the latter in various vertically adjusted positions relative to its support. As shown particularly in Fig. 4 of the drawings, the electrode 51 terminates at its lower end in a flat disk portion 56 which is arranged so as to register substantially with the chamber of the dipper 33 when the latter moves to its uppermost position under action of the spring 40, as indicated in Figs. 2 and 4 of the drawings.

The frame 26 is electrically grounded or otherwise suitably electrically connected with one side or pole of the electrical operating circuit for the present control, while the opposite side or pole of the circuit is connected with the electrode 51 by way of a lead wire or conduit 57. Thus, due to the direct contact between the metal of the frame 26 and the metal comprising the pivot shaft 30, the arm 31, and dipper 33, the latter is electrically charged, in order that a circuit may be completed between the electrode 51 and the dipper 33 when there is a sufficient level of slushy ice crystals within the dipper, such as indicated at 58 in Fig. 4. The limit of upward movement of the arm 31, and consequently of the dipper 33, is controlled by means of a stop device comprising an adjustable set screw 59 which is threaded through an opening formed in the base plate 27 of the frame in the vertical plane of the arm 31. A lock nut 60 serves to maintain the set screw 59 in any position of vertical adjustment with respect to the base plate 27. The stop member 59 is thus adjustable, within limits, as is the electrode 51 itself, to determine the level of ice crystals 58 within the dipper 33 necessary to close an electrical circuit between the electrode 51 and the dipper body 33.

Also embodied in the electrical operating circuit for the present control is a switch S having a spring-pressed actuator plunger or button 62 normally engaged and depressed by means of a cam follower arm 63 which rides upon the outer peripheral surface of the cam disk 45 when the latter is driven by the motor 48. As noted particularly in Figs. 2 and 3 of the drawings, the cam disk 45 is provided with a single dwell portion or recess 64 which, upon each complete rotation of the disk 45, permits the outer end of the follower 63 to move outwardly with respect to the plunger 62 and thereby momentarily open the switch S. As will be hereinafter more fully explained, the position of the recess 64 is so adjusted relative to the position of the crank stud or pin 44 carried upon the cam disk 45 that the switch S is opened just prior to the time that the dipper 33 reaches its uppermost position in registration with the electrode 51. As soon as the recess 64 of the cam disk has passed the outer end portion of the follower 63, the switch S is again closed and maintained so throughout the remainder of the cycle of rotation of the disk 45.

Referring to the wiring diagram of Fig. 6, for the sake of simplicity, the dipper 33 and stationary electrode 51 are represented by the switch X which is connected in series between the power lines L1 and L2 with the winding of the relay switch R. The relay switch R is of a type provided with a movable armature A having a pair of switch blades R1 and R2. The switch blade R1 is arranged, upon deenergization of the relay winding, to normally close a circuit between a pair of contacts C1 and C2 which are connected in series with the compressor motor 14 between the power lines L1 and L2. The switch blade R2 of the armature is normally disposed, upon deenergization of the relay R, in circuit-breaking relation to a second pair of contacts C3 and C4 which are interposed within a hold-in circuit for the relay switch R. Connected in series with the contacts C3 and C4 is the switch S which, as previously explained, is opened only momentarily with each complete revolution of the cam disk 45. The contact C4 is connected by a lead wire 66 with the relay switch circuit, as at 67, in bypassing relation to the switch X.

The operation of the control disclosed in Figs. 1-6 is as follows: The receptable body 11 is filled to a desired level with a beverage, such as a liquid fruit juice, and the main power supply lines for the dispenser are connected with a suitable source of electrical energy, at which time the agitator and ice-removing device 24a is driven to constantly circulate the beverage within the receptacle. Also, the motor 48 is energized to constantly drive the cam disk 45 in rotation. Rotation of the cam disk results in swinging movement of the arm 31 and dipper 33 between the bottom of the receptacle and a position in registry with the stationary electrode 51, as determined by the set screw 59. It will here be understood that the speed of rotation of the cam disk 45 is relatively slow, the same preferably turning at the rate of from one-third to one-fifth revolution per minute. Thus, it will be seen that movement of the arm 31 and its associated dipper 33 is relatively slow and gradual, and that a complete cycle of movement of the arm between its successive elevated or testing positions within the receptacle takes from three to five minutes, depending upon the speed of rotation of the cam disk 45.

Assuming that the beverage introduced within the receptacle 11 is fresh and relatively warm, and that the refrigeration apparatus has not had sufficient time to reduce the temperature of the beverage to the normal freezing point and thereby form ice crystals within the beverage; movement of the dipper in an upward direction from its broken line position in Fig. 2 permits liquid portions of the beverage to drain through the perforate bottom wall of the dipper 33 as the same rises above the level of beverage within the receptacle, and as the dipper reaches its uppermost position in registry with the stationary electrode 51, the switch X will remain open due to the absence of ice, or, for that matter, any conducting material between the electrode 51 and the dipper body 33. Thus, the relay switch R will remain deenergized, in which condition the switch blade R1 maintains the operating circuit for the compressor motor 14 causing refrigerant to be circulated through the refrigeration system to chill the heat exchange assembly 19 and consequently the beverage within the receptable 11.

After the refrigeration system has operated for a time sufficient to reduce the temperature of the beverage to its freezing point, and until a desired proportion of ice particles is formed within the beverage, say in the neighborhood of 50% to 60% apparent volume of ice particles within the beverage, the cycling of the arm 31, which is continuous throughout the operation of the dispenser, causes the dipper 33 in its upward movement to collect a representative quantity of ice crystals 58 therein, and as the dipper 33 rises above the level of the beverage within the receptacle 11, liquid portions of the beverage within the dipper drain outwardly through the perforate bottom wall 34, leaving only a mass of slushy ice crystals therein. As the dipper 33 approaches and reaches its uppermost position, as determined by the set screw 59, if the level of ice particles within the dipper is sufficiently high, the ice will contact the electrode 51 and complete an electrical circuit between the electrode 51 and the dipper 33 which results in a closure of the switch X and the operating circuit for the relay switch R. Thus, as the relay switch R is energized, the armature A moves upwardly, disengaging the switch blade R1 from the contacts C1 and C2 to open the operating circuit for the compressor motor 14, and to stop operation of the refrigerating system and the cooling of the heat exchange assembly 19. At the same time, the switch blade R2 is engaged with the contacts C3 and C4 to complete a hold-in circuit for the relay switch R and to maintain the same energized until the dipper has once again moved downwardly within the receptacle to extract a successive sample from the main body of the beverage, and thence moves upwardly to a position just short of registration with the stationary electrode 51. At this point, the cam follower 63 moves into the dwell or recess 64 of the cam disk 45, breaking the hold-in circuit for the relay switch by opening the switch S. This results in deenergization of the winding or coil of the relay switch R, permitting the blade R1 to engage the contacts C1 and C2 and once again energize the compressor motor 14. The dipper continues its upward movement into registry with the stationary electrode 51, and if by this time there is an insufficient level or quantity of ice particles within the dipper 33 to establish an electrical circuit between the electrode 51 and the body of the dipper 33, the relay switch R will not be energized, and the compressor motor 14 will remain energized to further cool the beverage within the receptacle.

It should be understood that the function of the switch S, contacts C3 and C4, and switch blade R2 is to provide a hold-in circuit for the relay switch R to maintain the compressor motor 14 in a deenergized condition for the next succeeding cycle of movement of the dipper 33, following closure of the switch X as a result of sufficient ice particles within the dipper 33 during the preceding operating cycle of the dipper. Were it not for the hold-in circuit for the relay switch R, movement of the dipper 33 from its uppermost position would result in deenergization of the relay switch R regardless of the quantity of ice within the dipper, thus causing the compressor motor M to remain energized at all times, with the exception of the time when the ice particles actually bridged between the stationary electrode 51 and the dipper 33.

Thus, for example, assuming that a complete cycle of movement of the arm 31 and dipper 33 requires three minutes, and that there is a desired percentage of ice crystals within the beverage, the hold-in circuit provided by the switch S, contacts C3 and C4, switch blade R2, and lead 66 causes the relay switch to remain energized, thus breaking the circuit for the compressor motor 14 during the next succeeding cycle of operation of the dipper and until the cam follower 63 engages the dwell or recessed portion of the disk 45, thus breaking the hold-in circuit.

Referring now to Figs. 8–11 which show a modified type of control for maintaining a substantially constant proportion of ice particles within the beverage, the numeral 70 designates a bracket-type frame supported upon the upper rim of the receptacle body 11 after the manner of the frame 26. The frame 70 supports a cylindrical casing 71 in which is housed the elements of an electrical control circuit as illustrated diagrammatically in Fig. 11, and which comprises a timer motor 72, a thermostatic switch 73, a relay switch 74, and a solenoid 75. Depending from the casing 71 and journaled therein is an elongated drive shaft 76 which extends substantially to the bottom of the receptacle 11 and is drivingly connected with an open-topped, cylindrical valve member 77. Also disposed in depending relation to the casing 71 are a pair of tubular casings 78 and 79. The casings 78 and 79 carry at the lower ends thereof a complemental cylindrical casing body 80 which is open along its bottom and which rotatably receives the valve member 77 in relatively close-fitting telescoping relation thereto to define a substantially enclosed sampling chamber 81. Each of the tubular casings 78 and 79 extends within the chamber 81, and the casing 78 contains in its lower end an electrical resistance-type heater element 82. The opposite tubular casing 79 contains in the lower end thereof a thermally-responsive element 83 consisting of a coil of relatively small conduit 84 which is closed at its lower end and which is connected at its upper end with a suitable expansion element, such as a bellows 85, disposed within the casing 71 in actuating relationship to a switch arm 86. As shown in the circuit diagram of Fig. 11, the thermally-responsive element 83, bellows 85, and switch arm 86 are represented by the single switch symbol and reference numeral 73.

The side walls of the valve member 77 and outer casing 80 are provided with sets of diametrically disposed openings 87 which, upon partial rotation of the shaft 76 and valve member 77 in one direction, are brought into registration with one another to open the testing chamber 81 to the main body of beverage disposed in the lower portion of the receptacle 11. Conversely, upon movement of the valve member 77 in the opposite direction, the openings 87 in the outer casing 80 are closed by the imperforate portion of the valve member to retain within the chamber 81 a sample or segregated part of the beverage. It will here be understood that the agitator device 24a functions during rotation to constantly circulate beverage through the openings 87 and the chamber 81 when the openings 87 are in registry, in order that, upon opening of the chamber 81, substantially no portion of the beverage will be trapped within the chamber for any prolonged period of time.

As shown particularly in Fig. 9, the shaft 76, at its upper end, is connected with a crank arm 76a which, in turn, is pivotally connected at its outer end with the armature of the solenoid 75, and the shaft 76 is so arranged as to be rotated approximately 60 degrees upon energization of the solenoid 75 to a position closing the openings 87 in the outer casing 80. Conversely, upon deenergization of the solenoid 75, a spring 88 is arranged to rotate the crank arm 76a and shaft 76 in the opposite direction to bring the openings 87 into registry, and thereby to open the sampling chamber 81.

Referring once again to the circuit diagram of Fig. 11, it will be seen that the thermostatic switch 73 is connected in series with the winding of the relay switch 74 between the power lines L1 and L2, whereby the relay may be energized upon closure of the switch 73. The relay 74 is provided with an armature having two separate switch blades 89 and 90 which, upon deenergization of the winding of the relay switch, are disposed in normally open relationship to the stationary contacts 91, 92, 93 and 94. The contacts 93 and 94 are arranged in series circuit with the compressor motor 14, and upon energization of the relay switch 74, the lowermost switch blade 90 engages the contacts 93 and 94 and closes the operating circuit for the compressor motor 14.

The set of contacts 91 and 92 forms a part of a hold-in circuit for the winding of the relay switch 74, and the contact 92 is connected in bypassing relationship to the thermostatic switch 73, as by means of a lead 95. Connected between the contact 91 and the power line L1 is a pair of leads 96 which have interposed therein a first cam follower switch 97 which is actuated by a cam disk 97a driven by the electric timer motor 72. The cam disk 97a is formed with a single relatively short dwell portion which causes only momentary opening of the switch 97 during each revolution of the disk 97a, for a purpose to be hereinafter more fully explained.

The timer motor 72 drives a second cam disk 98a which serves to actuate a second cam follower switch 98. The second cam follower switch 98 is disposed in series circuit with the heater 82 and the solenoid 75, the latter being connected in parallel with one another. The second cam disk 98a is formed to provide a dwell region which extends approximately one-third of the circumference of the disk 98a, in order that the cam follower switch 98 may be opened for approximately one-third of the time required for each complete revolution of the disk 98a.

In the operation of the control shown in Figs. 8—11, the speed of rotation of the timer motor 72 and its associated cam disks 97a and 98a is relatively slow, and preferably of the order of one-sixth R. P. M. Thus, one complete revolution of the cam disks requires, say, a six minute period, during which the cam follower switch 98 is closed for approximately four minutes and opened for approximately two minutes. The cam disk 97a is so arranged relative to the cam disk 98a that the dwell portion of the disk 97a is brought into registry with the switch 97 immediately prior to the time at which the dwell portion of the cam disk 98a comes into registration with the cam follower switch 98. Thus, the switch 97 is opened momentarily just prior to the time of the opening of the switch 98, and thereafter remains closed during the remainder of each cycle of revolution of the cam disks.

Assuming now that the temperature of the beverage within the receptacle 11 is above the normal freezing temperature thereof, and that the thermostatic switch 73 is set so as to close the operating circuit for the relay switch 74 when the temperature of a sample of beverage within the testing chamber 81 reaches a predetermined high temperature, say in the neighborhood of 60° F., cycling of the timer motor 72 causes the cam follower switch 98 to close when riding upon the node portion of the cam disk 98a. Closure of the switch 98 results in simultaneous energization of the solenoid 75 and electrical heater 82, thus rotating the valve 77 to a closed position to trap a sample of beverage within the chamber 81.

Heat is transmitted to the test sample within the chamber 81 by means of the heater 82 for a period of, say, three and one-half minutes, and in the event that there is an insufficient quantity of ice crystals within the testing chamber 81, the temperature of the beverage within the testing chamber 81 will rise above the setting of the thermostatic switch 73 and cause the latter to close, thus energizing the relay switch 74. Energization of the relay 74 causes the lower blade 90 to engage the contacts 93 and 94 and thereby energize the compressor motor 14 which functions to circulate a refrigerant through the heat exchanger assembly 19. At the same time, upon energization of the relay 74, a hold-in circuit is made for the relay through the blade 89, contacts 91 and 92, and switch 97. Continued rotation of the cam disk eventually brings the dwell portion of the disk 97a into registration with the cam follower switch 97 to momentarily open the hold-in circuit just prior to the opening of the switch 98. As the switch 98 is brought into registry with the dwell portion of the disk 98a, the solenoid 75 and heater 82 are deenergized, thus resulting in the opening of the testing chamber 81 to provide a flushing cycle of approximately two minutes. During the flushing cycle, the previously heated test sample within the chamber 81 is discharged therefrom and fresh beverage circulated through the chamber. It will be understood that during the flushing cycle, the temperature within the chamber 81 will be materially reduced, thus causing the thermostatic switch 73 to once again open, but in view of the operation of the switch 97 in providing a hold-in circuit for the relay 74, the compressor motor 14 will remain energized to continuously circulate a refrigerant through the heat exchange assembly 19, thereby to cool the contents of the receptacle.

Assuming now that the percentage of ice crystals or particles within the beverage has reached a predetermined desired maximum, say 50% to 60% apparent volume, and the timer motor 72 cycles the disks 98a and 97a to a position closing the switches 98 and 97, energization of the solenoid 75 causes the valve 77 to close and trap a representative sample of the liquid and ice crystal components of the beverage in the chamber 81. Energization of the heater 82 transmits heat to the test sample within the chamber 81, but in the event that a sufficient quantity of ice crystals is present within the test sample, a large amount of the heat transmitted by the heater 82 will be absorbed by the test sample and utilized to change the ice crystals to a liquid without materially raising the temperature of the test sample. Thus, the ice crystals within the test chamber 81 function to absorb a proportion of the heat emanating from the element 82 in an amount equal to the latent heat of crystallization of the ice particles contained within the testing chamber 81. Consequently, during the heating cycle, the temperature of the beverage within the testing chamber 81 will not be raised sufficiently to cause closure of the thermostatic switch 73, and as the switch 97 is opened upon registry with the dwell portion of the cam disk 97a, the hold-in circuit for the relay switch 74 is likewise opened, thus deenergizing the compressor motor 14 and interrupting the passage of refrigerant to the heat exchanger 19.

In this manner, a substantially constant proportion of ice particles is maintained within the beverage at all times following the initial formation of ice crystals therein, with the thermostatic switch 73 functioning directly in response to the amount of heat transmitted through the test sample to control the energization of the compressor motor, and thereby the refrigeration of the beverage. It will be seen that the control apparatus illustrated in Figs. 8–11 produces substantially the same result as the control apparatus disclosed in Figs. 1–6 of the drawings, in that the refrigeration apparatus is operated directly in response to the amount or proportion of frozen particles within the beverage as determined by the associated sampling or segregating apparatus.

Figs. 12–18 of the drawing disclose a further modified form of control apparatus formed in accordance with the present invention, and which is directly responsive to the amount or percentage of ice crystals present in a segregated test sample taken from the main body of beverage to control the energization and deenergization of the compressor motor and consequently the refrigeration of the beverage. In this form of the present control, we employ a supporting frame 70 of the type shown in Fig. 8, the frame being supported upon the upper rim of the receptacle 11 to one side thereof, and out of the vertical plane of the agitator and ice-removing mechanism. The frame 70 supports thereon an upstanding bracket 100 and a relatively small, low speed electric motor 101. The motor 101 drives a cam disk or wheel 102 which is provided on one side thereof with an eccentric crank pin 103, and upon its outer peripheral surface with a single, relatively short, radially projecting node 104a. Slidably supported in vertically arranged openings formed in the frame 70 and bracket 100 is a vertically movable rod or shaft 104. The upper end of the rod 104 is provided with vertically adjustable and screw-threaded lock nuts 105, between which is clamped a laterally projecting switch-actuator pin 106. Directly below the lock nuts 105, the rod 104 carries a relatively elongated and laterally projecting ledge-forming bracket 107 which extends laterally outwardly from the rod 104 on the side thereof opposite the pin 106 and in overlapping relation to the crank pin 103 of the disk 102.

Disposed in the vertical plane of the switch-actuator pin 106 is an arm or lever 108 whose inner end is pivotally secured to a supporting post 109 carried upon the upper side of a switch casing 110. The outer end portion of the lever 108 is arranged to closely engage one side of a teetering latch plate 111 which is pivotally secured, as at 112, to the upper portion of the bracket 100, and which is free to swing in a vertical plane. The lower corner portion of the latch plate 111 is recessed to provide a locking shoulder 113 with which the outer end portion of the lever 108 may be engaged to hold the latter in a downwardly switch-closing position, as shown in Fig. 12. The switch 110 is provided on its upper surface with a spring-pressed actuator button 114 which is disposed in the vertical plane of the lever 108, and which, when depressed, serves to close a circuit between a pair of switch terminals 115 connected in series circuit between the power lines L1 and L2 with the compressor motor 14 of the refrigeration system.

The rod 104 is of a length to extend approximately to the bottom of the receptacle 11, and terminates at its lower end in a bifurcated extension 116 to which is secured a perforate circular plate or disk 117. The perforate plate 117 carried at the lower end of the bifurcated extension 116 is arranged to have its marginal edge portion extend slightly outwardly from the ends of the bifurcated extension 116, in order that the same may slidably fit within the bore of an annular metallic ring member 118. As shown particularly in Figs. 15–17, the annular metallic ring 118 is provided at either end thereof with annular flange-forming rings 119 which define at either end of the ring 118 a pair of circular openings of lesser diameter than the outer diameter of the perforate disk 117. The flanges 119 functions to retain the circular ring 118 on the perforate disk 117, but provide for limited vertical movement of the perforate disk 117 within the ring member 118.

Projecting outwardly from the side wall of the receptacle 11 and secured thereto, as by any suitable means, is a U-shaped magnet 120, the lower edge of which is spaced from the bottom wall of the receptacle a distance approximately equal to the throw of the crank pin 103. Advantageously, the ring member 118 may be formed upon its outer surface with a pair of diametrically opposed recesses 121 which serve as guideways for a pair of upstanding guide rods or pins 112 secured, for example, to the bottom wall of the receptacle 11.

The operation of the modified form of control as disclosed in Figs. 12–18 of the drawings is as follows: Upon energization of the motor 101, the cam disk 102 is rotated at a rate of, say, one-fifth to one-third R. P. M. Assuming that the crank pin 103 occupies its lowermost position as disclosed in Figs. 12 and 13, and that a fresh batch of beverage has been introduced within the receptacle 11, the perforate plate or disk 117, carried at the lower end of the rod 104, will occupy a position substantially resting upon the bottom wall of the receptacle and at the lower end of the ring member 118. Rotation of the cam disk 102 causes the crank pin 103 to engage the ledge or shoulder 107 carried upon the rod 104 and to elevate the same gradually, thus disengaging the pin 106 from the switch-actuating lever 108. As seen in Fig. 12, rotation of the disk 102 in a counterclockwise direction causes the single node 104a of the cam disk to move inwardly with respect to the edge of the teetering latch plate 107, thereby permitting the catch or shoulder 113 of the plate to swing inwardly and engage the outer end portion of the lever 108 and hold the same in depressing relation to the switch actuator button 114. Thus, the circuit for the compressor motor 114 is energized by closure of the switch 110. As the crank pin 103 moves upwardly, the rod 104 and perforate disk 117 are initially elevated within the ring member 118 to a position as shown in Fig. 15, wherein the outer marginal edge of the perforate plate 117 engages with the uppermost flange 119 carried on the ring member 118 and begins to lift the ring member 118 bodily upwardly to a position where the uppermost flange 119 is magnetically engaged with the U-shaped magnet 120, as shown in Fig. 16. In this position, the crank pin 103 has reached its uppermost position or throw, and continued rotation of the cam disk causes the pin 103 to move downwardly, thus permitting the rod 104 and perforate disk 117 to move downwardly by gravity to a position as shown in Fig. 17, wherein the perforate plate or disk 117 engages the lowermost inwardly directed flange 119 of the ring member 118, and the weight of the rod assembly is such as to overcome the magnetic forces of the magnet 120, breaking the ring member 118 therefrom and causing the same to drop by gravity downwardly into engagement with the bottom wall of the receptacle. During this free falling movement, the ring member 118 traps a representative sample of beverage adjacent the bottom wall of the receptacle 11, and as the crank pin 103 and rod 104 continue downward movement, any liquid portion of the beverage trapped within the ring member will be expressed outwardly through the perforations of the disk or plate 117, while any ice particles trapped within the ring member will be pressed downwardly by the plate 117 against the bottom wall of the receptacle 11. Thus, assuming that there is an insufficient proportion or amount of ice crystals trapped within the ring member 118, the perforate disk or plate 117 will move substantially to the bottom of the receptacle as illustrated in Fig. 12, and during such movement, if the switch 110 is open, the pin 106 will engage and swing the lever 108 downwardly into closing engagement with the actuator button 114 of the switch 110, thus energizing the compressor motor 14. At the same time, as the crank pin 103 reaches its lowermost throw, the node portion 104a of the cam disk has engaged the edge of the teetering plate 11 to unlatch the switch-actuating lever 108, but as the cam disk 102 continues in rotation, the plate 111 is free to swing to reengage the outer end portion of the lever 108 and hold the same in a closed position.

Assuming now that there is a sufficient predetermined proportion of ice crystals within the beverage, as the ring member 118 drops free from its position as shown in Fig. 17, a representative sample of beverage, including both liquids and ice particles, will be trapped therein, and downward movement of the perforate plate 117 only serves to compact the ice particles between the plate and the lower wall of the receptacle. Thus, the extent of downward movement of the rod 104 is limited by the level of ice within the ring member 118, and if the level of ice reaches a predetermined desired level, the switch-actuating pin 106 will not move the lever 108 sufficiently far downwardly to close the switch 110. In the event that the latch plate 11 occupies a locking position with respect to the end of the lever 108 as a result of a preceding cycle of the cam disk 102, the node portion 104a of the cam disk is so positioned as to swing the latch plate 111 leftwardly, as viewed in Figs. 12 and 14, disengaging the locking shoulder 113 from the outer end of the lever 108 and permitting the same to move upwardly and thereby open the switch 111, causing deenergization of the compressor motor 14 and an interruption of the refrigeration of the beverage. It will here be understood that the node portion 104a of the cam disk is so positioned relative to the crank pin 103 that the node portion swings the latch plate 111 outwardly to its unlocked position immediately prior to the arrival of the crank pin 103 to its lowermost throw position. Thus, if there is sufficient ice trapped within the ring member 118, the switch-actuating lever 108 will spring upwardly due to the relatively elevated position of the pin 106, thereby opening the switch 110.

In view of the foregoing, it will be seen that the present invention provides an improved control mechanism for refrigerated beverage dispensers of the type designed to produce and dispense semifrozen, ice-pregnant beverages, and that the present control apparatus functions efficiently and directly in response to the proportion or amount of ice crystals within the beverage to automatically control the refrigeration system of the dispenser in a manner to maintain a substantially constant and predetermined desired proportion of ice crystals within the beverage.

Beverage dispensers formed in accordance with the present invention are characterized by their operational efficiency, simplicity of construction, ease of operation and maintenance, and economy of manufacture. It is also to be noted that the present control apparatus lends itself to ease of installation and cleaning, as the same may be completely removed from an associated receptacle portion of the dispenser to permit individual parts thereof to be readily cleansed and/or repaired.

While we have disclosed what we feel to be preferred forms of the present invention, it will be understood that various modifications as to details may be resorted to without departing from the spirit of the invention or the scope of the following claims.

We claim:

1. In a machine for producing and dispensing a beverage having frozen particles therein, including a receptacle for the beverage, agitator means in said receptacle for circulating the beverage therein, refrigerating means for reducing the temperature of the beverage within the receptacle sufficiently to maintain a percentage of frozen particles in the beverage comprising a heat exchange member in thermal relation to the beverage within the receptacle, a compressor for circulating a refrigerant through said heat exchange member to cool the latter and an electric motor energizable to drive said compressor; that improvement which comprises means for measuring at spaced intervals during operation of said machine the relative proportions of frozen to unfrozen parts within the beverage; and switch means connected in the operating circuit of said motor and with said measuring means and responsive to a given proportion of frozen particles within the beverage as determined by said measuring means for opening the operating circuit of said motor to discontinue operation of said refrigerating means and responsive to a lesser proportion of frozen particles within the beverage as determined by said measuring means for closing the operating circuit of said motor.

2. In an electrically-actuated refrigerated dispenser for partially frozen beverages including a receptacle for the beverage, means for circulating the beverage within the receptacle to maintain homogeneity between frozen and unfrozen parts thereof, and a refrigeration system comprising a heat exchange member for cooling the beverage within the receptacle, a compressor for circulating a refrigerant through said heat exchange member and an electric motor energizable to drive said compressor; means for controlling the proportion of frozen to unfrozen parts within the beverage comprising means in said receptacle for segregating a portion of the beverage from the main body thereof, and switch means connected with said motor and responsive to the amount of frozen parts within said segregated portion of the beverage for controlling the energization of said motor.

3. In a machine for producing and dispensing a beverage having frozen particles therein, including a receptacle for the beverage, agitator means in said receptacle for circulating the beverage therein, refrigerating means for reducing the temperature of the beverage within the receptacle sufficiently to maintain a percentage of frozen particles in the beverage comprising a heat exchange member in thermal relation to the beverage within the receptacle, a compressor for circulating a refrigerant through said heat exchange member to cool the latter and an electric motor energizable to drive said compressor; that improvement which comprises means in said receptacle for segregating a part of the beverage from the main body thereof, and switch means associated with said segregating means and responsive to the amount of frozen particles in the segregated part of the beverage for controlling the energization of said motor and thereby the operation of said refrigerating means to maintain a substantially constant proportion of frozen particles within the beverage.

4. In a machine for producing and dispensing a beverage having frozen particles therein, including a receptacle for the beverage, agitator means in said receptacle for circulating the beverage therein, refrigerating means for reducing the temperature of the beverage within the receptacle sufficiently to maintain a percentage of frozen particles in the beverage comprising a heat exchange member in thermal relation to the beverage within the receptacle, a compressor for circulating a refrigerant through said heat exchange member to cool the latter and an electric motor energizable to drive said compressor; that improvement which comprises a dipper mounted within said receptacle; means connected with said dipper for moving the latter at intervals into and out of the beverage to extract a portion of the beverage from the main body thereof; and switch means connected in the operating circuit of said motor and responsive to the amount of frozen particles extracted by said dipper for controlling the energization of said motor and thereby the operation of said refrigerating means, said switch means serving to close the operating circuit for said motor when the amount of frozen particles extracted from the beverage is less than a predetermined amount, and to open the operating circuit for said motor when the amount of frozen particles extracted from the beverage is equal to or greater than said predetermined amount, whereby to maintain a substantially constant proportion of frozen particles within the beverage.

5. In a machine for producing and dispensing a beverage having frozen particles therein, including a receptacle for the beverage, agitator means in said receptacle for circulating the beverage therein, refrigerating means for reducing the temperature of the beverage within the receptacle sufficiently to maintain a percentage of frozen particles in the beverage comprising a heat exchange member in thermal relation to the beverage within the receptacle, a compressor for circulating a refrigerant through said heat exchange member to cool the latter and an electric motor energizable to drive said compressor; that improvement which comprises a hollow casing positioned in said receptacle below the normal level of beverage contained therein, means to open and close said casing at intervals to segregate a part of the beverage from the main body thereof; a heating element in said casing energizable to transmit heat to the segregated part of the beverage within said casing; and switch means including a temperature-responsive element positioned within said casing in spaced relation to said heating element for controlling the energization of said motor and thereby the operation of said refrigerating means in response to the temperature of the segregated part of the beverage.

6. In a machine for producing and dispensing a beverage having frozen particles therein, including a receptacle for the beverage, agitator means in said receptacle for circulating the beverage therein, refrigerating means for reducing the temperature of the beverage within the receptacle and comprising a heat exchange member in thermal relation to the beverage within the receptacle, a compressor for circulating a refrigerant through said heat exchange member to cool the latter and an electric motor energizable to drive said compressor; that improvement which comprises an open-ended casing arranged to move into engagement with the bottom of said receptacle to segregate a portion of the beverage contained in said receptacle from the main body thereof; means including a perforate plate member movable longitudinally within said casing to compact frozen particles present within a segregated portion of beverage against the bottom of said receptacle; and switch means electrically connected with said motor and responsive to the extent of movement of said last-named means within said casing for controlling the energization of said motor.

7. In an electrically-actuated, refrigerated dispenser for partially frozen beverages; a receptacle for the beverage; means for circulating the beverage within the receptacle to maintain homogeneity between frozen and unfrozen parts thereof; a refrigeration system including a heat exchange member for cooling the beverage within the receptacle, a compressor for circulating a refrigerant through said heat exchange member, and an electrically-actuated motor connected to drive said compressor; sampling means in said receptacle operable to segregate a portion of the beverage contained in said receptacle from the main body thereof; and switch means electrically connected with said motor and responsive to the proportion of frozen particles within the segregated portion of the beverage for controlling the energization of said motor, and thereby the refrigeration of the beverage.

8. An electrically-actuated, refrigerated dispenser as defined in claim 7, wherein said sampling means comprises a dipper arranged in said receptacle for movement into and out of a body of beverage contained therein to extract a portion of the beverage from the main body thereof, and wherein said switch means is responsive to the amount of frozen particles present in the portion of beverage extracted by said dipper for controlling the energization of said motor.

9. An electrically-actuated, refrigerated dispenser as defined in claim 7, wherein said sampling means comprises a hollow casing positioned in said receptacle below the normal level of beverage contained therein: means to open and close said casing to segregate a portion of the beverage from the main body thereof, a heating element in said casing energizable to transmit heat to the segregated portion of beverage within said casing; and wherein said switch means comprises a temperature-responsive element positioned in said casing in spaced relation to said heating element and operable in response to the temperature of the segregated portion of beverage for controlling the energization of said motor.

10. An electrically-actuated, refrigerated dispenser as defined in claim 7, wherein said sampling means comprises an open-ended casing movable into engagement with the bottom of said receptacle to trap therein a portion of the beverage contained in said receptacle; a perforate piston member movable longitudinally in said casing; and wherein said switch means is responsive to the extent of movement of said piston member within said casing.

11. In a machine for producing and dispensing a beverage having frozen particles therein, including a receptacle for the beverage, agitator means in said receptacle for circulating the beverage therein, refrigerating means for reducing the temperature of the beverage within the receptacle sufficiently to maintain a percentage of frozen particles in the beverage comprising a heat exchange member in thermal relation to the beverage within the receptacle, a compressor for circulating a refrigerant through said heat exchange member to cool the latter and an electric motor energizable to drive said compressor; that improvement which comprises means for measuring the relative proportions of frozen to unfrozen parts within the beverage; switch means connected in the operating circuit of said motor and with said measuring means and responsive to a given proportion of frozen particles within the beverage as determined by said measuring means for opening the operating circuit of said motor to discontinue operation of said refrigerating means and responsive to a lesser proportion of frozen particles within the beverage as determined by said measuring means for closing the operating circuit of said motor; and means associated with said switch means for maintaining the operating circuit of said motor closed for a predetermined time following energization of said motor by said switch means.

References Cited in the file of this patent

UNITED STATES PATENTS

| | | |
|---|---|---|
| 1,675,108 | Kellogg | June 26, 1928 |
| 2,134,787 | Hartman | Nov. 1, 1938 |
| 2,150,792 | Willat | Mar. 14, 1939 |
| 2,358,756 | Zoller et al. | Sept. 19, 1944 |
| 2,421,819 | Vandenberg | June 10, 1947 |
| 2,459,337 | Raney | Jan. 18, 1949 |
| 2,502,589 | Rabjohn | Apr. 4, 1950 |
| 2,576,253 | Farrell | Nov. 27, 1951 |
| 2,629,236 | Hull | Feb. 24, 1953 |